United States Patent [19]

Leyrer et al.

[11] Patent Number: 5,664,230

[45] Date of Patent: Sep. 2, 1997

[54] DATA PROCESSING WITH ADAPTABLE EXTERNAL BURST MEMORY ACCESS

[75] Inventors: Thomas A. Leyrer, Freising, Germany; Steven D. Sabin, Dallas, Tex.

[73] Assignee: Texas Instruments Incorporated, Dallas, Tex.

[21] Appl. No.: 451,645

[22] Filed: May 26, 1995

[51] Int. Cl.[6] .................................................. G06F 13/00
[52] U.S. Cl. ...................... 395/886; 395/855; 395/872; 364/DIG. 1; 711/118; 711/123; 711/138
[58] Field of Search ..................................... 395/465, 854, 395/855, 872, 876, 886, 445, 450

[56] References Cited

U.S. PATENT DOCUMENTS

| | | | |
|---|---|---|---|
| 5,014,187 | 5/1991 | Debize et al. | 395/886 |
| 5,201,041 | 4/1993 | Bohner et al. | 395/465 |
| 5,228,134 | 7/1993 | MacWilliams et al. | 395/465 |
| 5,255,378 | 10/1993 | Crawford et al. | 395/307 |
| 5,363,486 | 11/1994 | Olson et al. | 395/465 |
| 5,438,670 | 8/1995 | Baror et al. | 395/403 |

*Primary Examiner*—Frank J. Asta
*Attorney, Agent, or Firm*—Scott B. Stahl; Leo N. Heiting; Richard L. Donaldson

[57] ABSTRACT

A data processing device includes a data processing core (43), a cache (33) connected to the core and having a cache width, and a bus (31) for receiving from an information source external to the data processing device a burst of information having a width which exceeds the cache width by a width difference. The cache is coupled to the bus to receive and store a first portion of the burst which is equal in width to the cache width. A storage circuit (35) is coupled to the bus to receive and store a second portion of the burst corresponding to the width difference, and the storage circuit has an output coupled to the core.

7 Claims, 3 Drawing Sheets

DATA PROCESSING WITH ADAPTABLE EXTERNAL BURST MEMORY ACCESS

TECHNICAL FIELD OF THE INVENTION

The invention relates generally to data processing and, more particularly, to data processing applications wherein a central data processing unit such as a microprocessor performs burst memory accesses of an external memory.

BACKGROUND OF THE INVENTION

Data processing devices and systems are used in myriad applications which touch virtually every aspect of life. FIG. 1 illustrates at 10 part of a conventional data processing system including a CPU or microprocessor 11 and an external memory 13 such as, for example, SRAM or DRAM. In response to a request from the microprocessor 11, the external memory 13 provides the CPU 11 with an N-byte burst of data, which data is transmitted to the CPU 11 via bus 15. The desired portion of the N-byte data burst is input to the core 17 of CPU 11, and the entire N-byte data burst is stored in an N-byte wide cache 19.

FIG. 2 illustrates at 21 part of another conventional CPU. The CPU of FIG. 2 includes a core 23 and a K-byte wide cache 25, where K is less than N. The CPU of FIG. 2 thus could not be used in place of the CPU of FIG. 1, because the K-byte wide cache 25 of FIG. 2 is not wide enough to accommodate the N-byte bursts received from external memory 13 in FIG. 1.

It is therefore desirable to provide improvements which permit the CPU architecture of FIG. 2 to accommodate the N-byte data bursts received from the external memory 13 in the data processing system of FIG. 1.

According to the present invention, a buffer is provided to accommodate all bytes of an external memory burst which cannot be accommodated by the cache of the CPU.

DETAILED DESCRIPTION OF THE INVENTION

Figure 3:
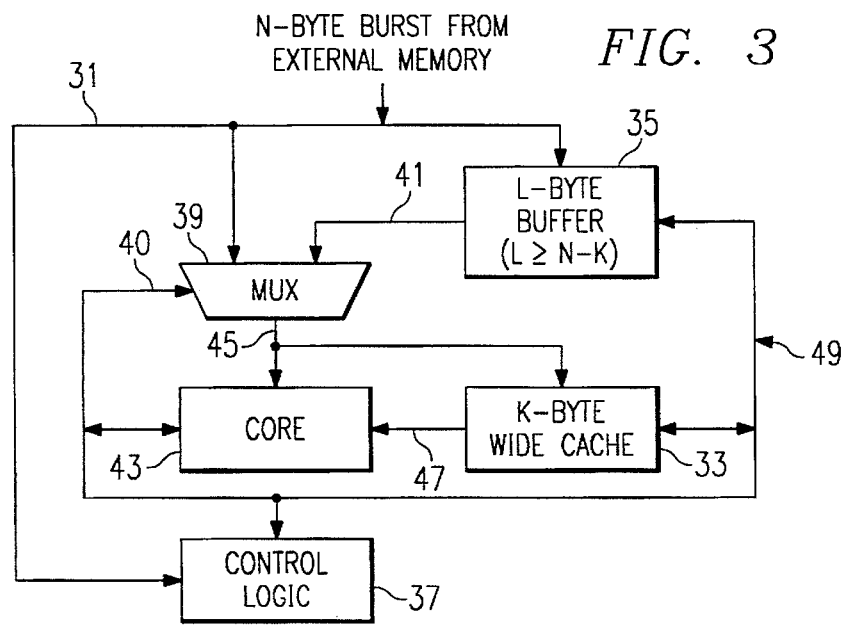
FIG. 3 is a block diagram which illustrates exemplary features of the present invention.

FIG. 3 illustrates part of a data processing device or CPU (for example, a microprocessor) according to the present invention. A bus 31 is provided to connect the CPU to an external memory for receiving from the external memory an N-byte data burst. The CPU of FIG. 3 includes a K-byte wide cache and, recalling that K is less than N, the cache of FIG. 3 cannot accommodate the N-byte burst received on bus 31. Bus 31 is connected to an L-byte buffer 35 where L is equal to or grater than (N−K), and to control logic 37, and to one data input of a multiplexer 39. The other data input of multiplexer 39 is connected to an output 41 of the buffer circuitry 35. The data output 45 of multiplexer 39 is connected to the cache 33 and a data processing core 43. The cache 33 provides data to the core 43 via a bus 47. The control logic 37 provides control to the cache 33, the buffer circuitry 35, the data processing core 43 and the multiplexer 39 via a control bus 49. The control logic 37 is also connected to bus 31 for communication with external memory.

Figure 1:
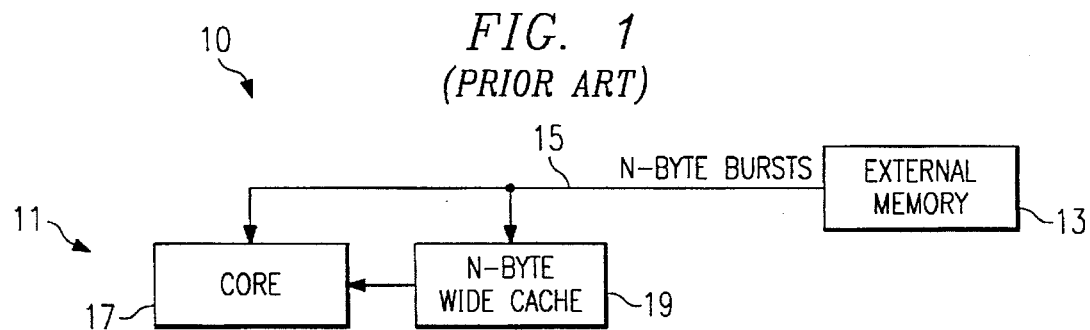
FIG. 1 illustrates part of a conventional data processing system wherein a CPU receives burst data from an external memory.
Figure 2:
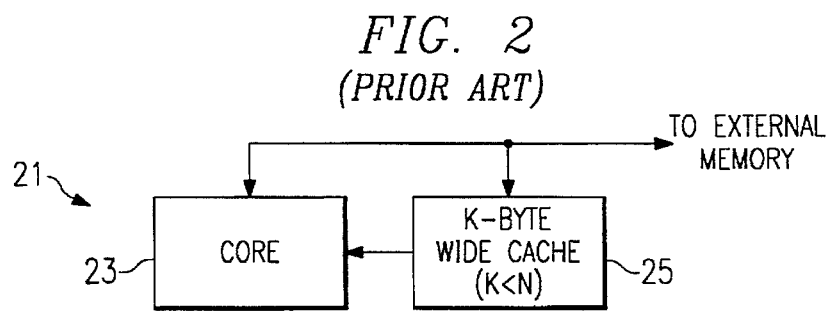
FIG. 2 illustrates part of a conventional CPU which has inadequate cache memory to accommodate the external burst cycles of FIG. 1.

When an N-byte burst from external memory occurs on bus 31, the control logic 37 provides the desired part of the burst to core 43, causes K bytes of the burst to be stored in the cache 33, and causes the remaining N−K bytes to be stored in the buffer 35 instead of in cache 33. Thus, it appears to the external system that the arrangement of FIG. 3 handles the N-byte burst in the same manner as the N-byte wide cache of FIG. 1.

The FIG. 3 arrangement can accommodate bursts of up to K+L bytes. Thus, for a given cache width K, the larger the buffer size L, the larger the range of burst sizes beyond K that can be accommodated. This provides a single, flexible and adaptable CPU that can be used in any one of various data processing systems which have different burst sizes up to K+L bytes.

Figure 4:
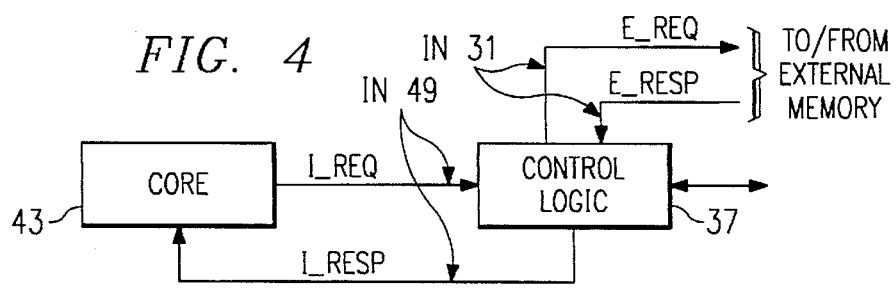
FIG. 4 is a block diagram which illustrates the interfaces between the control logic and the data processing core of FIG. 3, and between the control logic of FIG. 3 and external memory.

FIG. 4 illustrates exemplary signals involved when the CPU of FIG. 3 performs an external memory access. When the data processing core logic 43 requires data, either an operand or an instruction, it issues to control logic 37 via bus 49 an internal request I_REQ for the desired data. If the desired data is not present in the cache 33, then the control logic 37 issues to the external memory via bus 31 an external request E_REQ for the desired data. When the control logic 37 receives an external response E_RESP from external memory, an internal response I_RESP is issued from control logic 37 to the core logic 43 via bus 49 to indicate that the desired operand or instruction is available from external memory on bus 31.

Figure 5:
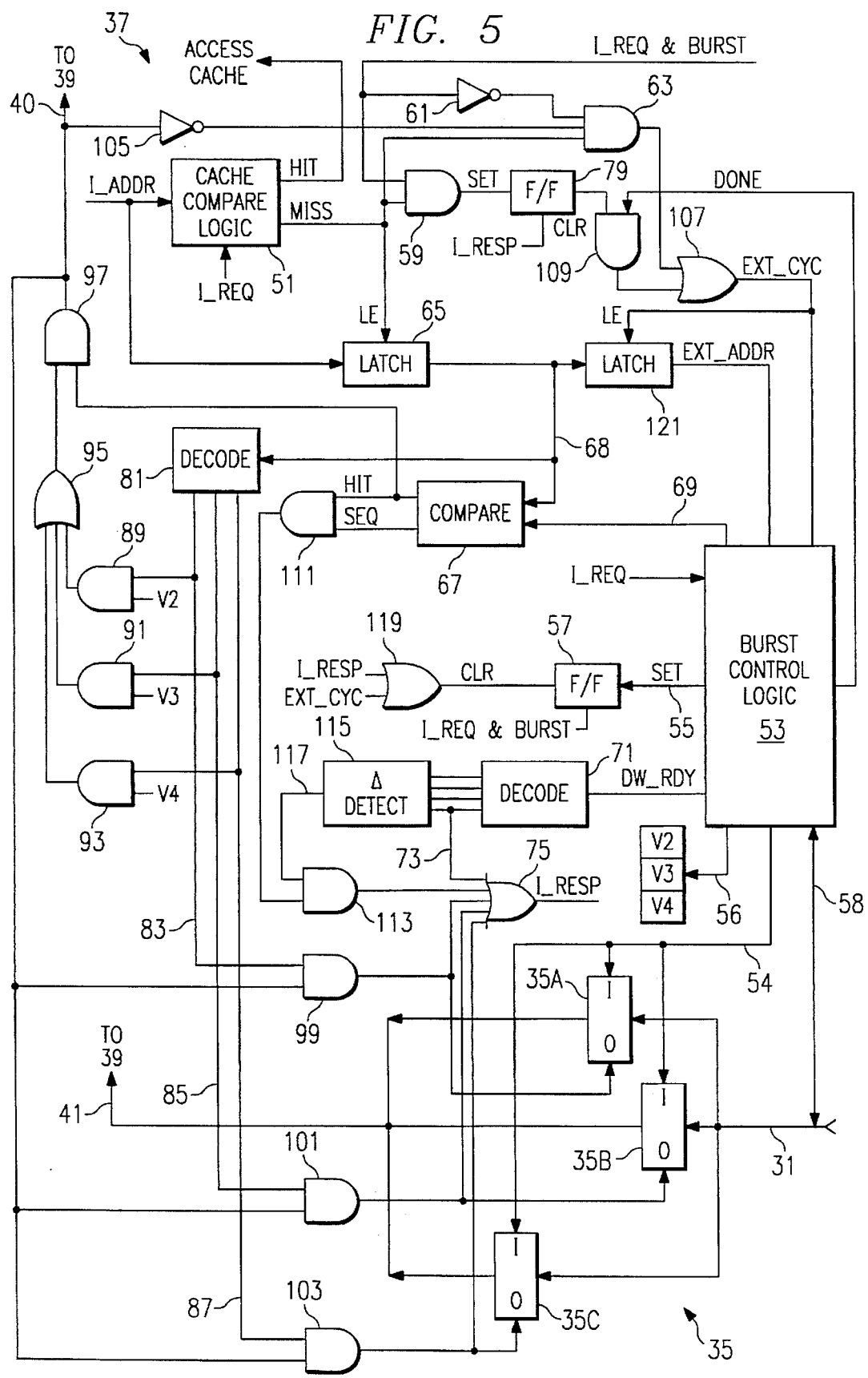
FIG. 5 diagrammatically illustrates an exemplary embodiment of the control logic and buffer circuitry of FIG. 3.

FIG. 5 shows an exemplary implementation of the control logic 37 and buffer circuitry 35 of FIG. 4. The internal request I_REQ from core 43 is received at control logic 37 along with a corresponding internal address I_ADDR which is the address in the system memory map of the desired operand or instruction. The internal address is input to cache compare logic 51 along with the internal request which triggers the cache compare logic to compare the internal address requested by core 43 to the addresses associated with the data stored in cache 33. If a cache hit occurs, then the control logic 37 accesses cache 33 in the conventional manner to provide the requested data to the core 43 via bus 47. The details of such a conventional cache access are well known in the art and have therefore been omitted for the sake of clarity.

Referring again to FIG. 3, for descriptive purposes only it will be assumed herein that N=16 and K=4, thus yielding a 16 byte burst from external memory, and a 4 byte wide cache 33, and requiring at least a 12 byte buffer 35. It is also assumed for descriptive purposes only that the 16 byte burst takes the form of 4 doublewords, each doubleword being 4 bytes long. In the disclosed example, for each 16 byte burst from external memory, one 4 byte doubleword is provided to the core 43 and to the 4 byte wide cache 33, and the remaining three 4 byte doublewords are stored in the buffer circuitry 35.

In FIG. 5, when burst control logic 53 receives the internal request from core 43 while an external burst access is in process, then burst control logic 53 outputs a signal 55 to set a flip-flop 57. The data output of flip-flop 57 is I_REQ&BURST, which indicates that an internal request has been received from core 43 while a burst access of memory is in process. I_REQ&BURST is input to an AND gate 59 inverter 61, the output of inverter 61 being input to AND gate 63. In the EXT_CYC input of burst control logic 53 is active, the burst control logic 53 initiates and performs, via busses 58 and 31, a burst access of external memory beginning at external address EXT_ADDR. The doubleword ready si DW_RDY output from burst control logic 53 indicates which doubleword of the 4 doubleword burst is currently available on the bus 31. This doubleword ready signal is decoded by decoder 71 into 4 outputs, one for each doubleword. The output 73 from decoder 71 is active when the first doubleword is available, and thus provides the internal response signal I_RESP to core 43 via OR gate 75. Because each external burst access is performed as a reset of a cache miss of an internal address, the first doubleword of the burst access will correspond to the internal address I_ADDR, that is, the internal address specifies the address of a 16 byte line and also specifies a doubleword within the 16 byte line. The burst access then appends second, third and fourth doublewords to complete the 16 byte burst. So, when the first doubleword is ready, the decoder 71 drives OR gate 75 to provide the internal response signal to the core 43, with the multiplexer configured to connect bus 31 to core 43. When the first doubleword is written into the core 43, it is so written into the cache 33 as is conventional in the art.

When the second doubleword of the burst is received, the burst controller 53 activates via control bus 54 the input control of buffer 35A to receive therein the second doubleword from bus 31. The burst control logic 53 similarly controls buffers 35B and 35C to receive the third and fourth doublewords, respectively, as they become available on bus 31. It is therefore seen from FIGS. 3 and 5 that the first doubleword of the 4 doubleword burst is provided to the core 43 and the cache 33, and the second, third and fourth doublewords of the burst are respectively stored in buffers 35A, 35B and 35C of buffer circuitry 35.

It should also be noted that valid bit V2 is set by burst control logic 53 via control bus 56 when the second doubleword is input to buffer 35A, valid bit V3 is set by burst control logic 53 when the third doubleword is input to buffer 35B, and valid bit V4 is set when the fourth doubleword is input to buffer 35C. Burst control logic 53 clears all three valid bits V2, V3 and V4 upon initiation of a new external access.

Assuming now that no burst access is currently in progress, and the first doubleword of the most recent burst access has been received in the core 43 and the cache 33, and the second, third and fourth doublewords of the most recent burst access are stored in buffer circuitry 35, if the core 43 issues another internal request with an internal address corresponding to, for example, the third doubleword of the most recent burst access, that is, the doubleword currently stored in buffer 35B, then the cache compare logic 51 will indicate a cache miss. Because no burst is currently in progress, the miss signal is disqualified at AND gate 59, and flip-flop 79 remains cleared by virtue of the internal response signal I_RESP which occurred at the end of the last burst access. The miss signal causes the internal address to be latched at 65 and compared to the most recent external address accessed by burst control logic 53, which is output from logic 53 at 69. The comparator circuitry 67 compares the 16 byte line address of the current internal address at the output of latch 65 with the 16 byte line address of the most recently accessed external address. If the 16 byte line addresses match, then the HIT output of comparator circuitry 67 is driven high.

The comparator circuitry 67 also determines whether the doubleword requested by the current internal address sequentially follows doubleword requested by the most recently accessed external address, and if so sets its SEQ output high. In the present example, the address 68 latched at the output of 65 has a 16 byte line address which matches the 16 byte line address of the address at 69, but the address at 68 requests the third doubleword whereas the address at 69 requested the fourth doubleword. Thus, the HIT output of comparator circuitry 67 is driven high while the SEQ output is driven low. Decoding circuitry 81 decodes the doubleword identifier portion of the internal address 68. Outputs 83, 85 and 87 of decoding circuitry 81 are respectively driven high when the second, third and fourth doublewords are requested in the internal address 68. In the present example, the third doubleword is requested, so output 85 is driven high. With valid bit V3 also high (the third doubleword having been previously stored in buffer 35B), AND gate 91 drives the output of OR gate 95 high. The high output of OR gate 95, combined with the high HIT signal from comparator circuitry 67, drives the output of AND gate 97 high. The output of AND gate 97 drives AND gates 99, 101 and 103. Because 101 is also driven by decode output 85, the output of AND gate 101 is driven high, thereby causing buffer 35B to output the third doubleword stored therein onto the buffer output 41, while also causing the internal response signal I_RESP to be driven high via OR gate 75. The high output from AND gate 97 also drives the control input 40 of multiplexer 39, thereby selecting the output 41 of buffer circuitry 35 to be input to the core 43 and the cache 33. The high output from AND gate 97 is inverted at 105 to drive the output of AND gate 63 low, thereby ensuring that both inputs of OR gate 107 are low (flip-flop 79 remains cleared) so that EXT_CYC remains low and no new external burst cycle request E_REQ is initiated by burst control logic 53.

Figure 7:
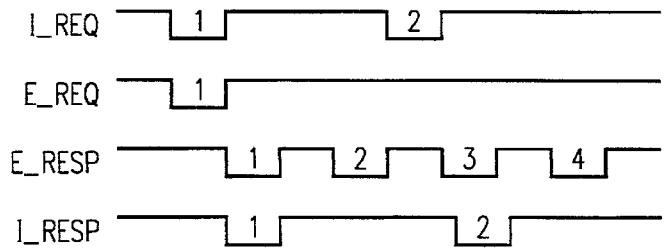

As another example, assume that the core 43 issues an internal request for the second doubleword (doubleword 2) of a given 16 byte line while an external burst access initiated by an earlier internal request for the first doubleword (doubleword 1) of the same 16 byte line is still in progress. Assume further that the internal request for doubleword 2 occurs after doubleword 2 has been received in the current burst access. This situation is illustrated in FIG. 7. The first internal request I_REQ in FIG. 7 is for doubleword 1, which internal request has resulted in a cache miss and has thus generated an external request E_REQ for doubleword 1. The external memory responds (E_RESP) by providing a burst including doublewords 1, 2, 3 and 4. When doubleword 1 is available from external memory, the core 43 is provided with the internal response I_RESP for doubleword 1, as shown in FIG. 7. By the time the second internal request, namely the internal request for doubleword 2, occurs in FIG. 7, doubleword 2 has already occurred in the burst access and has been input into buffer 35B.

In this example, the new instruction request occurs during a current burst access, so flip-flop 57 is set, thereby qualifying the cache miss signal at the input of AND gate 59, thus setting flip-flop 79. Also, the output of AND gate 63 is driven low via the operation of inverter 61. When the internal address for doubleword 2 at 68 is compared to the most recent external address 69, the HIT output of comparator circuit 67 is driven high but the SEQ output of comparator circuit 67 is driven low, because the most recently accessed external address was also doubleword 2. Decoder circuit 81 decodes doubleword 2 from the internal address at 68, thereby driving output 83 high, and with valid bit V2 also high, the output of AND gate 89 is driven high, thus driving the output of AND gate 97 high via OR gate 95 and the high logic level on the HIT output from comparator circuit 67. The high output from AND gate 97 selects the buffer output 41 to pass through multiplexer 39, and also combines with the high decoder output 83 to drive the output of AND gate 99 high, whereby doubleword 2 in buffer 35A is output to the buffer output 41 and the internal response signal I_RESP is driven high via OR gate 75. Thus, doubleword 2 is provided to the core 43 and the cache 33. As shown in FIG. 7, the external burst access continues while doubleword 2 is provided to core 43 and cache 33 from buffer 35A through multiplexer 39. Because doubleword 2 has already been received in the burst access and stored in the buffer 35A, it is immediately available when requested by internal request from core 43, as shown in FIG. 7 by the internal response for doubleword 2 immediately following the internal request I_REQ for doubleword 2.

Figure 6:
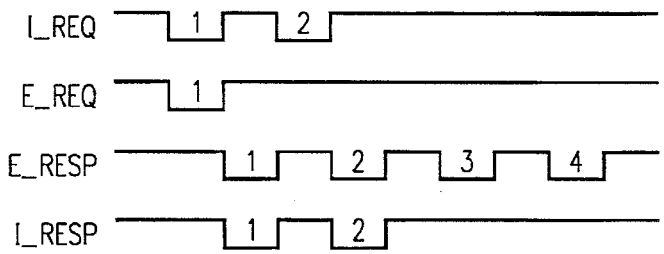
FIGS. 6 and 7 are timing diagrams which illustrate the operation of the circuitry of FIG. 5.

FIG. 6 illustrates an exemplary situation wherein, during the course of an external burst access and after an internal request I_REQ for doubleword 1 of a given 16 byte line address has been responded to but before doublewords 2, 3 or 4 have become available from external memory, the core 43 issues a request for doubleword 2 of the same 16 byte line address. In this instance, both the HIT and SEQ outputs of comparator circuitry 67 will be driven high. Decoder output 83 will also be driven high because doubleword 2 is requested, but valid bit V2 associated with doubleword 2 has not yet been set because doubleword 2 has not yet been received. Thus, the output of AND gate 97 is low, causing the control input 40 of multiplexer 39 to select bus 31 for connection to output 45 of multiplexer 39. With both the HIT and SEQ signals high, the output of AND gate 111 is driven high, thus qualifying at AND gate 113 the output of a change detecting circuit 115. The change detecting circuitry 115 is connected to the output of decoder circuitry 71 and detects any change in the 4 bit output of decoder circuitry 71. Recalling from FIG. 6 that doubleword 1 has already been received and applied to the core 43 and cache 33, the next change in the output of decoder 71 will occur when doubleword 2 is available. Thus, the output 117 of change detecting circuitry 115 will be driven high when doubleword 2 is available on bus 31, whereby the internal response to core 43 will be activated via OR gate 75, so that doubleword 2 is provided to core 43 and cache 33 directly from bus 31 through multiplexer 39, while simultaneously being input to buffer 35A.

The internal response I_RESP clears flip-flop 79, thus preventing AND gate 109 from initiating a new burst cycle when burst control logic 53 issues the DONE signal to indicate that the current cycle is done. The internal response I_RESP also clears flip-flop 57 via OR gate 119.

If the second internal request in FIG. 6 had been an internal request for doubleword 3, then the SEQ output of comparator 67 would be driven low, and the valid bit V3 would be low, thus preventing the control logic 37 from responding to the internal request during the current burst cycle. Instead, the cache miss signal and the I_REQ&BURST signal would be high, thus setting flip-flop 79 via AND gate 59 so that when the current burst access is completed and the burst control logic 53 issues the DONE signal, the output of AND gate 109 is driven high to thereby drive the output of OR gate 107 high, which latches the internal address 68 through latch 121 to the external address input of burst control logic 53. The high output of OR gate 107 indicates to burst control logic 53 that an external burst cycle beginning at address EXT_ADDR is required.

If an internal request I_REQ results in a cache miss while no burst cycle is in progress (I_REQ&BURST is low), and if the requested data is not in buffer 35 (output of AND gate 97 is low), then AND gate 63, OR gate 107 and latch 121 operate to cause burst logic 53 to initiate an external burst cycle beginning at the desired address, namely EXT_ADDR.

Referencing FIG. 3, because the data path from buffer 35 to core 43 and cache 33 does not involve bus 31, control logic 37 is advantageously able to perform transfers from buffer 35 to core 43 and cache 33 using the same on-chip clock rate that is conventionally used for transfers from cache 33 to core 43. The on-chip clock rate is typically at least twice as fast as the clock rate conventionally associated with transfers on bus 31.

When an external burst access occurs in FIGS. 3–5, only the one doubleword requested by the core 43 is stored in the cache 33, the other doublewords of the burst being stored in buffer 35. In contrast, in prior art FIG. 1 (and assuming N=16) all four doublewords from the external burst access are stored in cache 19. Thus, in the worst case in FIG. 1, three unused doublewords are stored in cache 19, which disadvantageously decreases the hit rate of cache 19, whereas in FIG. 3–5 there are never unused doublewords in cache 33.

Figure 8:
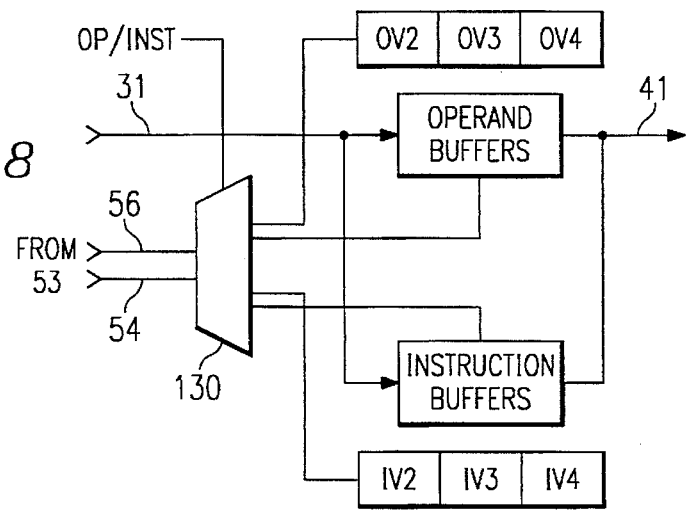
FIG. 8 illustrates an alternative modification of the circuitry of FIG. 5.

FIG. 8 illustrates the use of two buffer circuits such as 35, one for operands and one for instructions, so that, for example, previously bufferred instructions need not be flushed when fetching operands from external memory. The control lines at 54 and 56 are switched into connection with the desired buffers and valid bits by a de-multiplexing circuit 130. The valid bits associated with operand doublewords are designated OV2, OV3 and OV4 in FIG. 8, and the valid bits associated with instruction doublewords are designated IV2, IV3 and IV4 in FIG. 8. The OP/INST control signal in FIG. 8 is high when operands are being fetched and low when instructions are being fetched, and may be generated by burst control logic 53.

Figure 9:
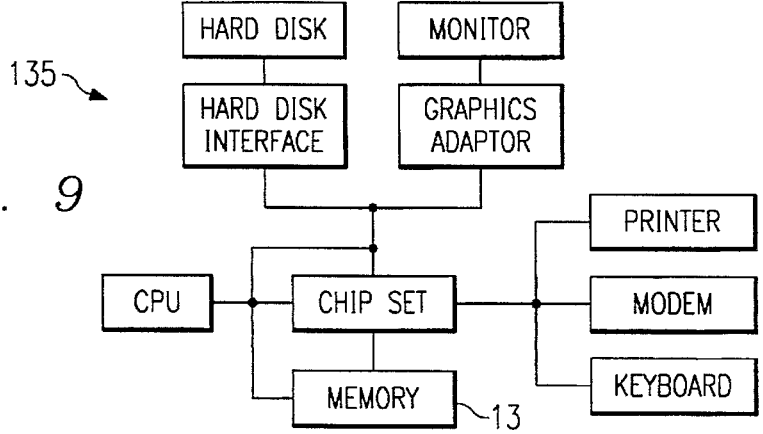
FIG. 9 illustrates an exemplary data processing system according to the present invention.

FIG. 9 illustrates an exemplary data processing system 135 according to the present invention. The CPU incorporates the features described above with respect to FIGS. 3–5, and the remaining components of the system 135 of FIG. 9 are well known and commonly found in data processing systems, for example, personal computer systems. As described above, the present invention permits a CPU with a given cache width to interface with external system memory which provides data in bursts that are larger than the cache width, and the fact that the burst size exceeds the cache width of the CPU is transparent to the components of the system external to the CPU.

Although exemplary embodiments of the present invention are described above, this description does not limit the scope of the invention, which can be practiced in a variety of embodiments.

What is claimed is:

1. A data processing device, comprising:
   a data processing core;
   a cache connected to said core and having a cache width;
   a bus for receiving a burst of information which originates externally of said data processing device and which has a width that exceeds said cache width by a width difference;
   said cache coupled to said bus to take therefrom and store a first portion of the burst which is equal in width to said cache width; and a storage circuit coupled to said bus to receive and store a second portion of said burst corresponding to said width difference, said storage circuit having an output coupled to said core.

2. A data processing device, comprising:

a data processing core;

a cache connected to said core and having a cache width;

a bus for receiving a burst of information which originates externally of said data processing device and which has a width that exceeds said cache width by a width difference;

said cache coupled to said bus to take therefrom and store a first portion of the burst which is equal in width to said cache width;

a storage circuit coupled to said bus to receive and store a second portion of said burst corresponding to said width difference;

a signal path extending from an output of said storage circuit to said core and said cache; and control logic having an output which is connected to said storage circuit and which signals said storage circuit to output onto said signal path a part of said second portion of said burst for transfer of said part to said core and said cache while said second portion of said burst is still being received by said storage circuit.

3. A data processing device, comprising:

a data processing core;

a cache connected to said core and having a cache width;

a bus for receiving a burst of information which originates externally of said data processing device and which has a width that exceeds said cache width by a width difference;

said cache coupled to said bus to take therefrom and store a first portion of the burst which is equal in width to said cache width; and a storage circuit coupled to said bus to receive and store a second portion of said burst corresponding to said width difference, said storage circuit having an output coupled to said core, said storage circuit including a first storage portion for storing said second portion of the burst when the burst is an operand burst, and said storage circuit including a second storage portion for storing said second portion of the burst when the burst is an instruction burst.

4. A data processing device, comprising:

a data processing core;

a cache connected to said core and having a cache width;

a bus for receiving a burst of information which originates externally of said data processing device and which has a width that exceeds said cache width by a width difference;

said cache coupled to said bus to take therefrom and store a first portion of the burst which is equal in width to said cache width;

a storage circuit coupled to said bus to receive and store a second portion of said burst corresponding to said width difference; and a signal path extending from an output of said storage circuit to said core and operable to transfer information from said storage circuit to said core at a first transfer rate that is faster than a second transfer rate associated with information transfers on said bus.

5. A data processing device, comprising:

a data processing core;

a cache connected to said core and having a cache width;

a bus for receiving a burst of information which originates externally of said data processing device and which has a width that exceeds said cache width by a width difference;

said cache coupled to said bus to take therefrom and store a first portion of the burst which is equal in width to said cache width;

a storage circuit coupled to said bus to receive and store a second portion of said burst corresponding to said width difference;

a signal path extending from an output of said storage circuit to said core; and said storage circuit including a valid bit which, when active while said burst is in progress on said bus, indicates that part of said second portion of said burst is accessible at said output of said storage circuit for transfer to said core via said signal path while said burst is still in progress.

6. A data processing device, comprising:

a data processing core;

a cache connected to said core and having a cache width;

a bus for receiving information which originates externally of said data processing device and which is provided in bursts that are wider than said cache width by a width difference;

said cache coupled to said bus to take therefrom and store a first portion of the burst which is equal in width to said cache width;

a storage circuit coupled to said bus to receive and store a second portion of said burst corresponding to said width difference, said storage circuit having an output coupled to said core; and control logic having an input connected to said core to receive therefrom requests for information, said control logic coupled to said bus and having an output which, if information requested by said core during a first said burst is unavailable from said cache and said storage circuit, requests a second said burst after completion of said first burst, said second burst including the information that was requested by said core during said first burst.

7. A data processing device, comprising:

a data processing core;

a cache connected to said core and having a cache width;

a bus for receiving information which originates externally of said data processing device;

control logic having an input connected to said core to receive from said core a request for information, said control logic having an output which is coupled to said bus and which, in response to a request from said core for a unit of information having a width equal to said cache width, requests an externally-originated burst of information which includes said requested unit of information and which has a burst width that exceeds said cache width by a width difference;

said cache coupled to said bus to take therefrom and store said requested unit of information; and a storage circuit coupled to said bus to receive and store a portion of said burst corresponding to said width difference so that only said requested unit of information is stored in said cache, said storage circuit having an output coupled to said core.

* * * * *